Patented Jan. 31, 1933

1,895,529

UNITED STATES PATENT OFFICE

HUGH STOTT TAYLOR, OF PRINCETON, NEW JERSEY, AND WILBUR A. LAZIER, OF WILMINGTON, DELAWARE, ASSIGNORS TO E. I. DU PONT DE NEMOURS & COMPANY, OF WILMINGTON, DELAWARE, A CORPORATION OF DELAWARE

PROCESS OF CATALYTIC DEHYDRATION

No Drawing. Original application filed June 24, 1926, Serial No. 118,356. Divided and this application filed July 28, 1927. Serial No. 209,168.

This invention relates to catalytic processes of dehydrogenation and dehydration of organic compounds wherein an oxide catalyst is used together with a substance that has the effect of repressing either the dehydrogenation or dehydration.

In the field of organic chemistry, the production of numerous important compounds depends on the ease and completeness with which a molecule of hydrogen or one of water may be detached from a single molecule or from two different molecules of more available or less costly compounds. Such reactions are conveniently termed dehydrogenations or dehydrations, depending on the minor products of reaction and together constitute two of the most important classes of organic reactions.

Dehydrations are necessarily restricted to oxygen-containing compounds, the preparation of ethers or olefins from alcohols being familiar examples. In general, condensations which take place with the elimination of water may be considered dehydrations. As examples of such condensations by dehydration, the formation of mesityl oxide and phorone from acetone and the preparation of ethers from alcohols may be cited. Dehydrogenations are broader in their application because hydrocarbons and other non-oxygen-containing organic compounds may be dehydrogenated as well as compounds containing the hydroxyl group. The removal of hydrogen from cyclohexanol to form phenol is a familiar example of the detachment of hydrogen directly linked to carbon, while the preparation of acetaldehyde from ethanol, or acetone from isopropanol illustrates dehydrogenation of the hydroxyl group.

It is well known that in order to bring about a practical speed of dehydrogenation or dehydration, the process must be conducted at elevated temperatures so the reactions are usually carried out in the vapor phase. The use of certain catalysts or porous inorganic solids possessing extensive surfaces also greatly facilitates the reactions. As most catalytic masses are not strictly specific in their action, the conditions necessary for operation tend to aggravate the undesired side reactions. It is particularly difficult to select contact materials which will cause only dehydrogenation or dehydration of alcohols, the greater number being more or less mixed in their behavior. In certain cases it has been found that the more active catalysts are often mixed catalysts while the "pure" catalysts possess very inferior activity.

As has been mentioned, one of the most important and familiar uses of dehydrogenation and dehydration reactions is in treating alcohols to obtain ethers, aldehydes, ketones or olefins. When subjected to dehydrogenating influences, primary alcohols yield aldehydes and secondary alcohols yield ketones, the other product, of course, being hydrogen. Tertiary alcohols are not capable of dehydrogenation and undergo only dehydration. Methanol is dehydrated to dimethyl ether, while all other alcohols readily yield unsaturated hydrocarbons under the influence of dehydrating catalysts.

It is known that reduced metals such as copper, iron, or nickel are especially efficacious for the strict dehydrogenation of alcohols, but often are so vigorous in their action that the aldehydes or ketones formed are split up with the formation of carbon monoxide and saturated hydrocarbons. Other disadvantages of these metallic catalysts are their extreme sensitivity to catalyst poisons, particularly sulfur compounds, and their tendency to sinter, i. e., to deteriorate under the influence of high temperature.

It has been known for a long time that non-reducible or slowly reducible oxides are catalysts for the dehydrogenation or dehydration of alcohols. For example, the oxides of aluminum and thorium have marked dehydrating properties. Others such as magnesia are predominatingly dehydrogenating, while still others such as chromium oxide giving mixed reactions are scattered between these. Sabatier (Catalysis in Organic Chemistry) has arranged the non-reducible oxides in order of their tendencies to dehydrate or dehydrogenate alcohols, but recent investigators have shown that such a rigid classification is not valid, as the behavior of the catalytic oxide is dependent in part on its method of preparation.

According to the present invention, the dehydrogenating or dehydrating character of oxide catalysts may be profoundly altered by the addition of small amounts of substances which of themselves may have little or no effect on the reaction. We have found in particular that the alkali and alkali earth metals in the form of their oxides, carbonates, hydroxides, or salts with feeble acids such as organic acids, exercise a marked repressing effect on dehydration reactions while strongly acidic oxides in the form of acids, ammonium salts, or anhydrides have a similar effect in repressing dehydrogenation. Zinc oxide which normally gives about 5% of dehydration and 95% dehydrogenation, becomes a dehydration catalyst by the addition of 10% of zinc sulfate. In a similar manner, the 5% of dehydration normally present entirely disappears after the addition of a few percent of sodium carbonate to the catalyst. This invention now makes it possible to select a suitable catalyst from the standpoint of durability, activity, and insensitivity to poisons, and then so to alter the qualitative performance of the mass as to suit the needs of the process in question. We have found that the effect of carbonates, oxides, or hydroxides of alkali or alkali earth metals, or of acid oxides is general in its application and that the qualitative behavior of any oxide catalyst is altered by the addition of any base, or of any oxide markedly more acidic than the oxide treated.

Most oxide catalysts that can be used for the dehydrogenation or dehydration respectively of organic compounds, do not have a single effect, that is, they do not cause the reaction to proceed entirely in the desired direction but give rise to a mixed dehydrogenation and dehydration. Among such oxide catalysts may be named the following: the oxides of beryllium, magnesium, zinc, aluminum, silicon, titanium, germanium, zirconium, tin, cerium, thorium, vanadium, bismuth, chromium, molybdenum, tungsten, uranium, manganese, iron, or any of the rare earths, etc. Each oxide has its own peculiar normal effect in the reaction as regards the relative proportions or moles of dehydrogenated and dehydrated product produced. This effect can be changed and controlled by the addition to the oxide catalyst of another substance that may itself have no effect on the reaction, but which, nevertheless, will exert a very profound effect on the catalyst, causing it to act selectively so as to repress or suppress one of the dehydrogenating or dehydrating reactions taking place. This repression of either the dehydrogenation or dehydration, as the case may be, was hitherto unrecognized in the art so that there not only was no possible control of such reactions in the desired direction, but there was also no practical means of utilizing any desired oxide catalysts for a particular reaction. We accordingly designate those substances having such repressive or suppressive effects by the general term repressers or repressives, indicating thereby that the action may be either partial or complete in eliminating one of the dehydrogenating or dehydrating effects, while we indicate by the term suppresser or suppressive a substantially total repressive effect. These repressers are neither to be considered components or constituents of mixed catalysts, nor are they to be considered promoters or activators although these additional attributes may, in special cases, also be present incidentally.

Such oxide catalysts as enumerated above may be treated with a compound of one of the alkali or alkali earth metals of Groups 1 and 2 of the Periodic Table, either in the form of their oxides, carbonates, hydroxides, or salts with weak acids, etc., for the purpose of repressing the dehydration and thereby making the process more entirely one of dehydrogenation. In particular cases the effect will be almost, if not entirely, total, depending on the nature of the catalyst and the represser and the quantity thereof employed, which will vary in particular cases but which is rarely critical as regards quantity. In order to repress dehydrogenation we may employ acidic oxides such as those of manganese, sulfur, chromium, phosphorus, arsenic, silicon, titanium, tin, boron, and acid salts. These oxides may be in chemically combined form, e. g., in the form of acids, ammonium salts, or anhydrides. The term "acidic oxide" has been used to designate any oxide of an element the hydroxide of which possesses acid properties, i. e., reacts with bases to form salts in which the element in question is present in the anion or acid radical of said salts.

It is to be noted that the repressive effect of acidic oxides upon the dehydrogenating properties of a dehydrogenating-dehydrating oxide catalyst is not due to the dehydrating propensity of the represser itself, but to the fact that the represser is markedly more acidic than the catalytic oxide. This is indicated in the following example in which zinc sulfate is added to zinc oxide to repress the latter's dehydrogenating propensities. The zinc sulfate displays an acid reaction in aqueous solution, and furthermore contains an acidic oxide chemically combined therewith, namely, sulfur trioxide. In practice, the required repressive substance may be incorporated into the contact mass by co-precipitation, occlusion during precipitation, impregnation, grinding, or in any other way as by dry grinding the repressive material into the catalyst.

The following example will further illustrate the idea of the invention:

*Example 1.*—When the vapor of isopropanol is passed over a catalyst heated to 400° C. consisting of zinc oxide prepared by the gentle ignition of zinc oxalate, for every mole of the alcohol reacting there are produced about .05 moles of propylene and about .95 moles of acetone. But if the zinc oxide is triturated with a solution of sodium carbonate and dried in such a manner that the product contains 4.5% of sodium carbonate, the olefin obtained per mole of alcohol reacting is less than .01 moles and the acetone produced more than .99 moles. If, instead of sodium carbonate, about 7% of zinc sulfate is added to the zinc oxide, there are produced about 60 moles of propylene to every 40 moles of acetone.

By the use of the terms repressive agents and suppressive agents we refer to the ultimate or final effects of these added substances and not to any theory or mechanism of operation, or to any explanation of the ionic, molecular, or atomic relationships or groupings on the surfaces of the catalyst, which may or may not favor preferential, selective, or other action whose ultimate effect is the repression referred to above.

This application is a division of application Serial No. 118,356, filed June 24, 1926.

We claim:

1. The process of dehydrating a secondary alcohol which comprises passing said alcohol over a catalyst composition containing essentially a catalytic oxide having both a dehydrogenating and a dehydrating effect, said composition also containing essentially an acidic oxide which is markedly more acidic than said catalytic oxide whereby to repress said dehydrogenating effect.

2. The process of claim 1, in which the alcohol is maintained in the vapor state during the dehydrating reaction.

3. The process of preparing propylene which comprises passing the vapor of isopropanol over a catalyst comprising essentially a mixture of zinc oxide and zinc sulfate at 400° C.

4. The process of preparing an olefin which comprises passing the vapor of a secondary alcohol over a catalyst composition containing essentially an oxide catalyst having both a dehydrogenating and a dehydrating effect and taken from the group consisting of the oxides of beryllium, magnesium, zinc, aluminum, silicon, titanium, germanium, zirconium, tin, cerium, thorium, vanadium, bismuth, chromium, molybdenum, tungsten, uranium, manganese, iron and any of the rare earth metals, said composition also containing essentially an acidic oxide which is markedly more acidic than the said oxide catalyst whereby to repress the dehydrogenating effect of said catalyst and being taken from the group consisting or the oxides of manganese, sulfur, chromium, phosphorus, arsenic, silicon, titanium, tin, boron and aluminum.

5. The process of preparing an olefin which comprises passing the vapor of a secondary alcohol over a catalyst composition containing essentially a catalytic oxide having both a dehydrogenating and a dehydrating effect, said composition also containing essentially an acidic oxide which is markedly more acidic than said catalytic oxide whereby to repress said dehydrogenating effect.

6. The process of dehydrating a secondary alcohol which comprises passing such alcohol in contact with a catalyst composition containing essentially zinc oxide and an acidic oxide.

7. The process described in claim 6 in which the catalyst comprises essentially zinc oxide and zinc sulfate.

8. The process described in claim 6 in which the catalyst comprises essentially zinc oxide and zinc sulfate and the alcohol is isopropanol.

In testimony whereof we affix our signatures.

HUGH STOTT TAYLOR.
WILBUR A. LAZIER.